United States Patent Office
3,705,206
Patented Dec. 5, 1972

3,705,206
VINYL ETHERIFIED EPOXY RESINS COPOLYMER-
IZED WITH CARBOXY AND VINYL CONTAIN-
ING MONOMERS
Bernhard Broecker, Hamburg, Germany, assignor to
Reichhold-Albert-Chemie Aktiengesellschaft, Hamburg,
Germany
No Drawing. Filed Dec. 23, 1970, Ser. No. 101,092
Claims priority, application Switzerland, Dec. 24, 1969,
19,207/69
Int. Cl. C08g 45/04
U.S. Cl. 260—837
10 Claims

ABSTRACT OF THE DISCLOSURE

The present invention concerns a process for the manufacture of vinyl-modified synthetic resins, which can be diluted with water, based on polyethers, characterized in that (a) compounds carrying epoxide groups and optionally also hydroxyl groups, of general formula

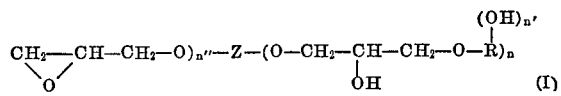

wherein
(I) Z denotes an alkyl, aryl or cycloalkyl radical, if either $n$ is zero and $n''$ is 1, $n'$ can be 0, 1, 2 and 3 or
(II) Z denotes an alkylene, arylene or cycloalkylene radical if $n$ and $n''$ is 1 or if $n$ is zero and $n''$ is 2, $n'$ can be 0, 1, 2 and 3 or
(III) Z denotes the radical of the following formula:

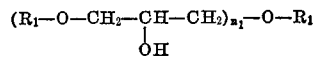

if $n$ is zero and $n''$ is 2, or if $n$ as well as $n''$ is 1, with $n_1$ in all cases being zero or a small number and with $R_1$ representing an aliphatic or aromatic radical,
are etherified by heating, optionally in the presence of catalysts, with
(b)(b') alkanolamides of unsaturated fatty acids and/or (b'') oxalolines of unsaturated fatty acids, of general formula:

(II)

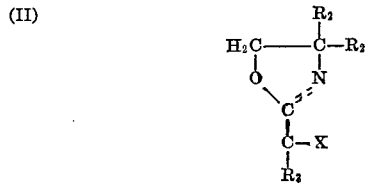

wherein $R_2$ represents a hydroxymethyl or alkyl radical with 3 carbon atoms, with at least one $R_2$ having to be a hydroxymethyl radical, $R_3$ is a hydrocarbon with single or multiple unsaturation and with 3 to 18 carbon atoms, preferably 16 to 18 carbon atoms, and X denotes $H_2$ or $=CH_2$, and
(c) the etherification products are reacted with such quantities of α,β-ethylenically unsaturated monocarboxylic acids and/or polycarboxylic acids and, where they exist, their anhydrides and/or their half-esters with monoalcohols with 1 to 4 carbon atoms, optionally in the presence of other vinyl or vinylidene compounds, by heating, so that the reaction products have an acid number of at least 25, and
(d) thereafter the reaction products, containing carboxyl groups, are treated with such amounts of ammonia and/or strong organic nitrogen bases, up to complete or partial neutralization, that the reaction products are adequately capable of dispersion in water or dilution with water.

This invention includes also the use of the new polyether resins in binders or coating agents which can be diluted with water, as sole binders or mixed with other binders for stoving lacquers, in coating compositions which can be deposited electrophoretically, as binders for air-drying coating compositions.

BACKGROUND OF THE INVENTION

Synthetic resins based on esters of fatty acids and compounds carrying epoxide groups have proved extremely successful as binders for surface protection (see Paquin, Epoxydverbindungen and Epoxydharze (Epoxide Compounds and Epoxide Resins) page 416, Springer Verlag, Berlin, Göttingen, Heidelberg 1958).

The present invention is concerned with the manufacture of water-soluble vinyl-modified synthetic resins based on polyethers. Previous synthetic resins which can be diluted with water suffer from the great disadvantage that they are not storage-stable in aqueous solution. On storage, the pH value of the neutralized products drifts into the acid region, whereby water-insoluble constituents are formed.

It is the task of this invention to provide water-soluble synthetic resins which are distinguished by extraordinary stability in an alkaline medium.

SUMMARY OF THE EMBODIMENT OF THE INVENTION

The subject of the invention is a process for the manufacture of vinyl-modified synthetic resins, based on polyethers, which can be diluted with water, characterized in that (a) compounds carrying epoxide groups and optionally also carrying hydroxyl groups, of general formula

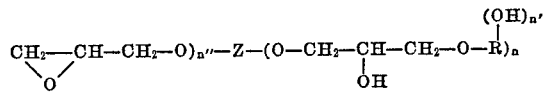

wherein
(I) Z means an alkyl, aryl or cycloalkyl radical, if either $n$=zero and $n''$=1, $n'$ can be 0, 1, 2 or 3, or
(II) Z denotes an alkylene, arylene or cycloalkylene radical, if $n$ and $n''$=1, or if $n$=zero and $n''$=2, and $n'$ can be 0, 1, 2 or 3, or
(III) Z denotes the radical of the following formula:

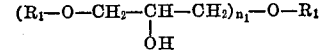

if $n$=zero and $n''$=2, or if $n$ and $n''$=1, with $n_1$ in all cases being zero or a small number, and with $R_1$ representing an aliphatic or aromatic radical,
are etherified by heating, optionally in the presence of catalysts, with
(b)(b') alkanolamides of unsaturated fatty acids and/or (b'') oxazolines of unsaturated fatty acids, of general formula:

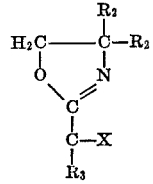

wherein $R_2$ represents a hydroxymethyl or alkyl radical with 3 carbon atoms, with at least one $R_2$ having to be a hydroxymethyl radical, $R_3$ is a hydrocarbon radical, with single or multiple unsaturation, with 3 to 18 carbon atoms, preferably 16 to 18 carbon atoms, and X denotes $H_2$ or $=CH_2$, and (c) the etherification products are reacted with such quantities of α,β-ethylenically unsaturated monocarboxylic acids and/or polycarboxylic acids and, where they exist, with their anhydrides and/or their half-esters with monoalcohols with 1 to 4 carbon atoms, optionally in the presence of other vinyl or vinylidene compounds, by heating and choice of the amounts of the reactants, so that the reaction products possess an acid number of at least 25, and (d) thereafter the reaction products, containing carboxyl groups, are treated with such amounts of ammonia and/or strong organic nitrogen bases, up to complete or partial neutralization, that the reaction products are adequately capable of dispersion in water or dilution with water.

THE PRIOR ART

Swiss patent specification 456,814 describes water-soluble stoving lacquers, which are manufactured by etherifying a compound carrying epoxide groups with a half-ether of a glycol and subsequently esterifying these ethers with maleic anhydride. The products described there however also contain ester bonds in addition to the ether bonds and therefore only possess limited stability in alkaline, aqueous solution. USA patent specification 3,293,201 describes a water-soluble, air-drying binder, which is obtained by reaction of an oil-maleic anhydride adduct with the ester of an epoxide resin with an unsaturated fatty acid. This product again contains bonds which limit the stability of the polyester in alkaline, aqueous solution. Against this, the synthetic resins made according to the invention are distinguished by very high stability in aqueous alkaline solution

SUMMARY OF THE INVENTION

Suitable compounds, containing epoxide groups and optionally also hydroxyl groups, for synthesizing the reaction products are: epoxidized olefins, diolefins and oligoolefins, such as 1,2,5,6-diepoxyhexane and 1,2,4,5-diepoxyhexane.

Polyethers having epoxy groups are very suitable that can be made by etherification of bivalent alcohols or diphenols with epihalogenhydrines and dihalogenhydrines such as epichlorhydrines or dichlorhydrines, in the presence of alkali. These compounds are derived from glycols, such as ethylene glycol, diethylene glycol, triethylene glycol, 1,2-propylene glycol, 1,3-propylene glycol, 1,4-butylene glycol, 1,5-pentanediol, 1,6-hexanediol, and especially from diphenols, such as resorcinol, pyrocatechol, hydroquinone, 1,4-dihydroxynaphthalene, bis-(4-hydroxy-phenyl)-methane, bis-4-(hydroxy-phenyl)-methyl-phenylmethane, bis-(4-hydroxy-phenyl-tolyl)-methane, 4,4′-dihydroxy-diphenyl and 2,2-bis-4-hydroxy-phenyl-propane. The polyethers containing epoxide groups have the following general formula:

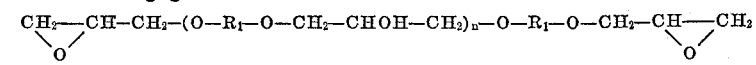

Herein, $R_1$ denotes an aliphatic or aromatic hydrocarbon radical and $n$ is zero or a small whole number between 1 and 8.

Polyethers, containing epoxide groups, or general formula:

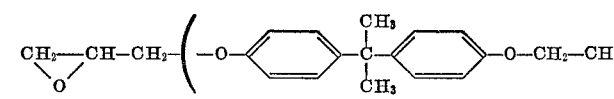 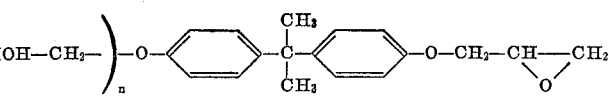

which contain 2,2-bis-4-hydroxy-phenyl)-propane as the starting compound, should be very particularly highlighted, and of these, in turn, those polyethers which have a molecular weight of between approx. 380 and approx. 3500 are preferably used.

For the etherification of these compounds containing epoxide groups, alkanolamides of unsaturated fatty acids and/or oxazolines of Formula II, which contain at least one ethylenic double bond, are employed. Preferably, however, those alkanolamides of unsaturated fatty acids and/or oxazolines of Formula II are employed which contain several ethylenic double bonds, and in the preferred embodiment at least a part of these double bonds should be present in a conjugated arrangement.

Suitable alkanolamine components of the fatty acid alkanolamides are preferably those with 1 to 6 carbon atoms, for example dialkanolamines or trialkanolamines, preferably monoalkanolamines, such as monoethanolamines, diethanolamine, amines of the propanols, the butanols or hexanols, such as isopropanolamine, dimethylaminopropanol, 2-amino-2-hydroxy-methyl-1,3-propanediol or the like.

These alkanolamines can for example be reacted with the unsaturated, preferably drying, fatty acids in the presence of catalytic amounts of a sodium alcoholate, such as sodium methylate, at temperatures of up to 100° C. Suitable fatty acids are, for example, straight-chain unsaturated fatty acids with 10 to 20 carbon atoms, such as palmitoleic acid, petroselinic acid, oleic acid, elaidic acid, 9,12-linoleic acid, 9,11-linoleic acid (in the cis, cis-trans and trans-trans form), linolenic acid, elaeostearic acid, lignoceric acid, erucic acid, arachidonic acid, clupanodonic acid, α-parinaric acid, α-licanic acid or their anhydrides, individually or as mixture. Preferably, fatty acid mixtures, such as are obtained from natural vegetable and animal fats, such as cottonseed oil, peanut oil, wood oil, ioticica oil, olive oil, poppyseed oil, boleko oil, olive kernel oil, perilla oil, rapeseed oil, sunflower oil, walnut oil, grapeseed oil, sardine oil, herring oil, menhaden oil and whale oil, and especially linseed oil, soja oil and safflower oil, are employed.

It is further possible to use: technical fatty acids, especially tall oil fatty acids, chemically treated fatty acids or fatty acids from chemically treated fats, especially dehydrated castor oil fatty acids, or conjugated fatty acids treated by catalytic processes or fatty acids from catalytically conjugated fats, especially conjugated linseed oil, soja oil as well as safflower oil fatty acids.

Excellent results are obtained with so-called technical linoleic acids which are obtained by distillation and which are distinguished by a high linoleic acid content (over 50% by weight), a low content of saturated fatty acids (less than 10% by weight) and only a very low content of linolenic acid (less than 2% by weight).

Suitable oxazolines of general Formula II are those which are obtained in a known manner by reaction of fatty acids or their esters with amines of monohydric or polyhydric alcohols, suitable alkanolamine components for the manufacture of the oxalzoline being preferably those with 1 to 6 carbon atoms, for example dialkanolamines or trialkanolamines, such as diethanolamine, amines of the polyhydric propanols, the polyhydric butanols or polyhydric hexanols, such as 2-amino-2-hydroxymethyl-1,3-propanediol, or the like.

Instead of the free acids, it is also possible to react their esters with lower alcohols with the alkanolamines, to give the alkanolamides.

The etherification is here carried out by heating, preferably in the presence of known etherification catalysts, in such a manner that the hydroxyl groups of the alkanolamides of unsaturated fatty acids and/or oxazolines of Formula II are always present in excess over the epoxide groups of the epoxide-carrying compounds. In the case of alkanolamides of unsaturated fatty acids and/or oxazolines of Formula II it is advantageous to choose the excess so as not to be as high. Here, however, at least 1.2 hydroxyl groups should be present per one epoxide group. In principle it is admittedly also possible to carry out the process with alkanolamides of unsaturated fatty acids and/or oxazolines of Formula II, using such quantity ratios that per hydroxyl groups one epoxide group is employed or that possibly the epoxide groups are even present in excess over the hydroxyl groups. However very highly viscous products are in general produced with such quantity ratios of the latter type, and the danger of gelling of the resins cannot be sufficiently safely excluded.

The etherification is carried out by heating the components $a$ and $b$ to temperatures of about 40 to about 150° C., with the temperature range of 60 to 120° C. being preferred. Working with known etherification catalysts is preferred. For example, boron trifluoride adducts, for example boron trifluoride-diethyl ether, organic tin compounds, for example dibutyl-tin dilaurate, and quaternary ammonium compounds, for example trimethylbenzyl-ammonium and others, can be used as catalysts for this purpose. The etherification products arising in this reaction must still be soluble in organic solvents, such as methyl isobutyl ketone, xylene, toluene, and glycol ethers such as n-butyl glycol and isobutyl glycol. The etherification can be carried out in the absence of solvents, but the presence of inert organic solvents is permissible.

The polyethers obtained are thereafter reacted with $\alpha,\beta$-ethylenically unsaturated monocarboxylic acids and/or polycarboxylic acids with warming. The reaction can here also be carried out in a mixture with other vinyl or vinylidene monomers, which do not carry any carboxyl groups. Possible vinyl monomers which do not carry any carboxyl groups are for example: alkyl esters of the $\alpha,\beta$-unsaturated monocarboxylic acids, such as methyl acrylate, ethyl acrylate, propyl acrylate, n-butyl acrylate, octyl acrylate, 2-ethylhexyl acrylate, decyl acrylate, lauryl acrylate, as well as the corresponding methacrylates, ethacrylates and phenylacrylates, propyl crotonate, n-butyl crotonate and the like. Further possibilities are: hydroxyalkyl esters of the $\alpha,\beta$-unsaturated carboxylic acids, such as 2-hydroxyethyl acrylate, 2-hydroxypropyl acrylate, 2-hydroxybutyl acrylate, 3-hydroxybutyl acrylate, 6-hydroxyhexyl acrylate and the corresponding methacrylates, ethacrylates phenylacrylates, 2-hydroxyethyl maleate, di-(2-hydroxypropyl)-maleate and the corresponding fumarates, 2-hydroxy-3-chloro-propyl acrylate, 2-hydroxy-1-phenylethyl acrylate, 2-hydroxy-3-butoxypropyl acrylate and the corresponding ethacrylates and phenylacrylates, but also other copolymerisable vinyl and vinylidene compounds such as styrene, nuclei-substituted styrenes, and styrenes substituted in the side-chain, such as $\alpha$-methylstyrene, $\alpha$-ethylstyrene, $\alpha$-chlorostyrene and the like. Of these monomers, the following are preferably employed: methyl acrylate, methyl methacrylate, ethyl acrylate, ethyl methacrylate, 2-hydroxyethyl acrylate, 2-hydroxypropyl acrylate and styrene, $\alpha$-methylstyrene and vinyltoluene, individually or as a mixture.

Suitable monomers carrying carboxyl groups are: acrylic acid, methacrylic acid, cinnamic acid, $\beta$-benzoylacrylic acid and crotonic acid; further, $\alpha,\beta$-ethylenically unsaturated polycarboxylic acids or their anhydrides, where they are capable of forming these, such as maleic acid, fumaric acid, citraconic acid, itaconic acid, methaconic acid, aconitic acid or monoesters of the above-mentioned polycarboxylic acids with saturated, straight-chain monoalcohols with 1 to 4 carbon atoms, preferably methanol, monomethyl maleate, halogen-substituted acids, such as chloromaleic acid and the like. The preferred $\alpha,\beta$-ethylenically unsaturated carboxylic acids include: acrylic acid, methacrylic acid, maleic anhydride, maleic acid and fumaric acid.

The monomers carrying carboxyl groups can be reacted individually, as a mixture with one another, individually mixed with the first-mentioned monomers not carrying any carboxyl groups, or as a mixture together with these, with the etherification product from stage (b). Other copolymerizable monomers for example acrylamide, methacrylamide, acrylonitrile, methacrylonitrile and the like, can be added, individually or as a mixture, as admixers to the monomer mixture. The vinyl and/or vinylidene proportion in the synthetic resin depends on the envisaged field of use of the binder. It should however in general not be less than 10% by weight, relative to the weight of the end product. Suitable end products for lacquer coating agents which are applied according to the electrophoretic application process, are especially end products which contain 10 to 30% by weight of copolymerized vinyl and/or vinylidene compounds. With such binders, particular care must be taken that the reaction with the copolymerized monomers is complete, that is to say that the residue of the monomeric components is very slight. In the case of too high a residual monomer component, difficulties can arise on electric deposition and with regard to pigment compatibility. Binders which contain 30 to 50% by weight of vinyl or vinylidene compounds, are especially suitable for use as air-drying coating compositions. If the reaction is carried out with $\alpha,\beta$-ethylenically unsaturated monocarboxylic acids, the conjoint use of larger proportions of vinyl and/or vinylidene compounds without carboxyl groups is, in this case, preferred. The proportion of monocarboxylic acids should in general not amount to more than 30% by weight, relative to the monomer mixture, since otherwise the resulting end products tend to gel, and precipitates can relatively easily be produced during manufacture.

In the case of the reaction of $\alpha,\beta$-ethylenically unsaturated dicarboxylic acids or their partial esters, the reaction can also be carried out satisfactorily without the conjoint use of vinyl and/or vinylidene compounds which do not carry any carboxyl groups. It is however advantageous, especially when using those dicarboxylic acids which are relatively strong acids, that is to say which display pK values of less than 4, to block all hydroxyl groups of the polyether before the reaction with the polyethers, since otherwise esterification during copolymerisation cannot be excluded. This blocking of the hydroxyl groups can be effected by reaction with acid anhydrides, for example acetic anhydride and the like, or also by reaction with isocyanates, for example toluylene diisocyanates, which easily react with hydroxyl groups. When using $\alpha,\beta$-ethylenically unsaturated carboxylic acids which are less strongly acid, this danger does not exist. The reaction of the polyethers with the monomers carrying carboxyl groups, for the purpose of copolymerization, is carried out with warming, preferably under the action of known polymerization catalysts. The reaction temperatures depend on the catalyst system used. Reaction temperatures of between 120 and 180° C. are preferred as the most advantageous ranges, using di-tert.-butyl peroxide, optionally in combination with known chain stoppers, preferably laurylmercaptan. When using low temperatures, say about 120° C., the reaction mixture is frequently too highly viscous for easy processability. Furthermore the speed of reaction which can be followed through the rise in the solids content, is rather slow for many monomers. When using high temperatures, say above 180° C., products of low viscosity are obtained even on purely thermal copolymerization. Especially when using $\alpha,\beta$-ethylenically unsaturated dicarboxylic acids or their anhydrides, it is advantageous to carry out the copolymerization without the use of a polymerization catalyst, merely through thermal action, at 180 to 220° C. The reaction speed can be increased by adding cobalt(II) salts, for example balt(II) chloride, in amounts of 3 to 6 parts per million The same reaction times are however also achieved by the presence of stainless steel material. The reaction can also be carried out in suitable solvents, Ethers of ethylene glycol, such as ethyl glycol, isopropyl glycol or n-butyl glycol, are especially suitable as such solvents. Aromatic solvents, such as xylene, toluene or benzene, can admittedly also be used, but must in general be removed again after completion of the reaction.

The viscosities of the reaction products should be between 95 and 800 cp., measured 1:1 in n-butyl glycol at 20° C. This can be achieved, firstly, by appropriate selection of the monomer mixture and, further, by controlling the viscosity through the temperature and through the use of appropriate solvents. Furthermore, the viscosity can also simultaneously be controlled by the addition of known so-called regulators, as has already been explained above. The reaction products are then converted into their salts by adding ammonia and/or strong organic nitrogen bases, such as for example trimethylamine, triethanolamine, triisopropanolamine, diglycolamine, diethylamine, piperidine, morpholine, diethanolamine, n-dimethylethanolamine and n-methylethanolamine the like. By strong organic nitrogen bases there are here to be understood secondary or tertiary amines which reach a pH value of at least 9 in 50% by weight aqueous solutions. It is at the same time not necessary to neutralize the carboxyl groups of the reaction product completely, and instead it suffices to add such an amount of amine that the products can at least be diluted with water. It is advantageous to effect the dilution with water in the presence of so-called hydrophilic solvents. Suitably hydrophilic solvents of this nature are: ethers of ethylene glycol, such as ethyl glycol, isopropyl glycol and butyl glycol, and also ethers of diethylene glycol, such as diethyene glycol diethyl ether and diethylene glycol dimethyl ether, but also alcohols, such as methanol, ethanol, propanols, butanols, sec.-butanol and tert.-butanol, and also ketone-alcohols, such as diacetone-alcohol.

UTILITY OF THE INVENTION

The invention furthermore relates to the use of the new polyether-resins in binders or coating agents which can be diluted with water, as sole binders or mixed with other binders, for stoving lacquers. A preferred use of the new polyether resins is in their use as sole binders or mixed with other binders, in coating compositions which can be deposited electrophoretically. A further preferred embodiment consists in the use of the new synthetic resins as binders for air-drying coating compositions.

The coating compositions used according to the invention can be unpigmented or pigmented and/or contain fillers. They can for example be applied into timber, concrete, brickwork or plaster, and also onto iron and steel, as well as onto non-ferrous metals, with or without pretreatment, such as passivation, phosphatization, electrochemical treatment, galvanizing, tin-plating or other metallization processes, in accordance with various methods, including the electrophoretic method of application. Pigments and/or fillers are for example—without thereby restricting the invention—red iron oxide, carbon black, lead silicochromate, strontium chromate, blanc fix, micronized varieties of baryte, microtalc, colloidal chalk, diatomaceous earth, china clay, titanium dioxide, chromium oxide and others.

The use of strongly basic pigments, such as zinc oxide, zinc chromate, lead carbonate, basic lead sulphate, red lead or calcium plumbate, requires precise testing. These pigments can tend to thicken or precipitate. The binders used according to the invention can be stoved at an elevated temperature. When using them as stoving lacquers, it can be advantageous to admix water-soluble or at least hydrophilic, low-molecular aldehyde condensation products, for example, phenol resols and/or condensation products which form aminoplastics. Mixing the new, water-soluble polyethers with relatively low molecular, at least hydrophilic, heat-curable condensation products, such as reaction products which form aminoplastics, and/or phenol resols and/or etherified phenol resols, causes greater cross-linking of the stoved coating agents and hence a further improvement in their technical lacquer properties, such as hardness, gloss, corrosion protection and the like.

By heat-curable, hydrophilic condensation products of low molecular weight there are also to be understood those condensation products which when heated alone, whilst reaching a relatively high molecular state, do not yet reach an infusible state. It is also not absolutely essential for the admixed condensation products to display water solubility in themselves. It is merely necessary for their hydrophilic character to suffice to give adequate compatibility in combination with the new water-soluble polyether resins which optionally act as plasticizers, that is to say stoved clear lacquer films must be homogeneous and no separation of the binder constituents must occur in the aqueous coating agents, even at the processing concentration.

Examples of suitable heat-curable, hydrophilic, low molecular condensation products are phenol-alcohols and phenol-polyalcohols, that is to say products which are still low molecular, and are obtained by condensation, of mono-hydric or polyhydric phenols with aldehydes, such as formaldehyde, acetaldehyde, crotonaldehyde, acrolein, benzaldehyde, furfurol and the like, or compounds which yield formaldehyde, such as paraformaldehyde, paraldehyde or trioxymethylene. The preferred aldehyde is formaldehyde or a formaldehyde-yielding compound, which is obtained in an alkaline medium in a known manner, such as for example, hexamethylenetetramine. Suitable phenols are phenol, and phenols which are substituted in the o-, o'-p-position but can be condensed with formaldehyde, such as cresol or xylenol. Phenols, such as propylphenol or butylphenol, especially, p-tert.-butylphenol, are very suitable. Resols from binuclear phenols, such as diphenol and bisphenol A, are furthermore suitable. Resols based on bisphenol A, which contain approx. 1.75 to 2.5 mols of formaldehyde as an adduct per mol of bisphenol A, are especially suitable. Phenolcarboxylic acid, which has been obtained by condensation of formaldehyde or formaldehyde-yielding compounds with suitable phenolcarboxylic acids, can also be very well used. Amongst the phenolcarboxylic acids which can be condensed with formaldehyde, 4,4-bis(4-hydroxyphenyl)-valeric acid occupies a preferred position. Here again, the most advantageous results are obtained if 1.75 to 2.5 mols of formaldehyde are bonded per mol phenolcarboxylic acid. The manufacture of further suitable phenolcarboxylic acid resols is for example described in German displayed specification 1,113,775. The phenolcarboxylic acid resols, especially those based on 4,4-bis(4-hydrophenyl)-valeric acid, are very suitable for combination purposes for the products according to the invention which are intended for use, as coating compositions and lacquer binders which can be deposited electrophoretically. It is very advantageous for at least a part of the formaldehyde condensation products to be etherfied with lower monohydric aliphatic alcohols with 1 to 4 carbon atoms, such as ethanol, methanol, propanols and butanols. Preferred phenol resols which can be diluted with water are those which have been obtained by reaction of phenol-aldehyde condensation products, etherified with alcohol, with aliphatic monohydroxycarboxylic or dihydroxycarboxylic acids or their esters, and which have been described in Belgian patent application 724,923.

Heat-curable, hydrophilic, low molecular condensation products which form aminoplastics are aldehyde reaction products of such compounds, capable of reaction with aldehydes, as urea, ethyleneurea, dicyandiamide and aminotriazines, such as melamine, benzoguanamine, acetoguanamine and formoguanamine. The abovementioned compounds can be reacted with aldehydes, such as formaldehyde, acetaldehyde, crotonaldehyde, acrolein, benzaldehyde, furfurol and the like. By aldehydes there are also to be understood aldehyde-forming compounds, such as paraformaldehyde, paraldehyde, and trioxymethylene. The preferred aldehyde is formaldehyde; preferred aldehyde-binding compounds are melamine and urea. The reaction takes place in the customary molar ratios, for example in a customary formaldehyde-molar ratio of 1:1.5 to 1.4 in the case of urea resins, and in a formaldehyde-molar ratio of 1:1.5 to 1:6 in the case of melamine resins. The condensation products which form aminoplastics are preferably employed in a partially or completely alkylated form. The etherification products of the lower half-ethers of glycol and diglycol, such as ethyl glycol and ethyl diglycol, with the methylolmelamine, such as are already described in Austrian patent specification 180,407, have also proved very suitable in the present instance. The most preferred position is occupied by low molecular condensation products of melamine with formaldehyde in a melamine/formaldehyde ratio of 1:4 to 1:6, which have been almost completely etherified with methanol. Ethers of nitrogen-containing polymethylol compounds partially esterified with dicarboxylic acids, such as are for example obtained by trans-esterification of hexamethoxymelamine with adipic acid, are also suitable.

Particularly preferentially, those melamine resin condensation products, capable of dilution with water, are employed which have been obtained by reaction of aminotriazine-formaldehyde condensation products, etherified with alcohol, which contain at least one mol of volatile alcohol radical bonded as an ether, with aliphatic hydroxycarboxylic acid esters of warming, and which have been described in French patent specification 1,544,219.

In the case of the new polyether-carboxylic acid resins, combinations which contain aminoplastic-forming or phenolplastic-forming condensation products to the extent of 10 to 30% by weight, relative to solids contents, are preferred.

SUMMARY OF A PREFERRED EMBODIMENT OF THE INVENTION

For the electrophoretic application process it is advantageous not merely to admix the heat-curable condensation products of the nature already explained above, namely phenoplastics and/or aminoplastics, but to subject the components to a reaction. The reaction, which can be described as a pre-condensation, is generally carred out at temperatures of 100 to 150° C., and care should be taken as fast as possible, by suitably conducting the reaction, that an esterification of the components does not occur but that instead a poly-etherification takes place as fast as possible. An appropriate conduct of the reaction for example consists of carrying out the reaction of the components in the presence of an acid catalyst, such as phosphoric acids, p-toluenesulphonic acid or benzoic acid, at temperatures between 100 and 150° C. In doing so, the heating is stopped immediately the acid number has declined by about 10 units, compared to the initial value of the acid number of the reaction mixture. This can preferably be achieved by employing etherified hydropholic, heat-curable condensation products as phenoplastics and/or aminoplastics. In order to achieve adequate trans-etherification, it is also advantageous to carry out the reaction in vacuo.

The stoving lacquers containing pre-condensates can be applied to the articles to be lacquered using the customary methods; they are above all suitable for lacquering sheet metal. Here, it is a particular advantage of the lacquers that they can also be deposited on the sheet metals in accordance with the electrophoresis process. The stoving of the lacquers can take place at temperatures of about 80 to 200° C., preferably of about 100 to 180° C., and over a time interval of about 10 to 80 minutes, preferably of about 20 to 60 minutes, depending on the stoving temperature.

The lacquers can optionally, and in practically all cases, advantageously contain at least one additional resin which is customary in relevant stoving lacquers which can be diluted with water, which is soluble in the lacquer system, and which differs from the polyether resin, as an additional component, attention having to be given to compatibility when choosing the nature and amount of the additional resin.

When using the resin combinations according to the invention as binders for stoving lacquers, an addition of compounds containing hydroxyl groups, especially amines, preferably polyamines, containing hydroxyl groups, proves advantageous. In a particular embodiment, the coating agents according to the invention contain, as strong organic nitrogen bases, at least one compound according to the general formula:

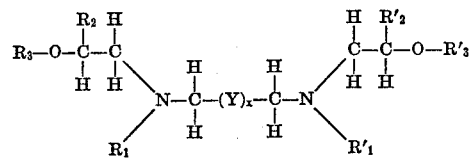

wherein the substituents and symbols have the following meaning:

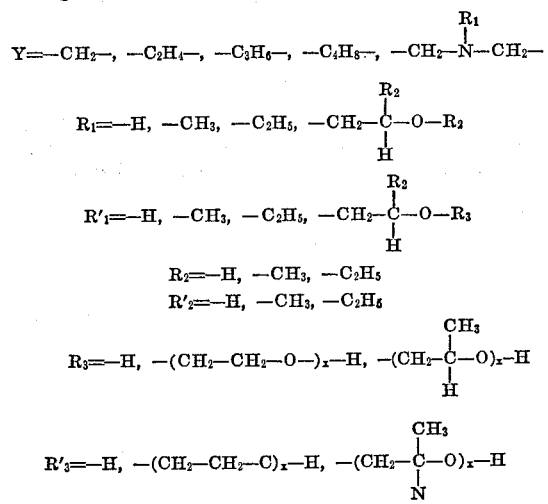

and
x means zero or an integer between 1 and 6.

Preferred polyhydroxypolyamines according to the above general formula are those which are characterized by complete substitution of the hydrogen atoms of polyamines by the 2-hydroxypropyl radical, especially the polyhydroxypolamines obtained by exhaustive reaction of diethylenetriamine and diethylenetetramine with propylene oxide. The manufacture of the abovementioned polyhydroxypolyamines is described in French patent specification 1,497,222.

The vinyl-modified polyethers made according to the invention can also be used for the manufacture of air-drying lacquers. In this case it is necessary to add driers to the lacquers. Suitable driers are cobalt, lead and manganese and other metal compounds, and the like, which are known to be relevant for lacquer manufacture. Those which can be dispersed in water are preferred.

In some cases it has proved appropriate to mix the vinyl-modified polyethers, capable of dilution with water, according to the invention, with dispersions based on styrene-butadiene copolymers, vinyl acetate homopolymers and vinyl acetate copolymers as well as pure acrylate copolymers, individually or as a mixture. The quantity ratios of the dispersions to the polyether resins made according to the invention can be 5 to 95 or 95 to 5% by weight.

ANOTHER PREFERRED EMBODIMENT OF THE INVENTION

In addition to the polyether resins in accordance with the invention the following reaction products are made from:

(1)

41% by weight of soy bean oil fatty acid monoethanolamide,
29% by weight of an epoxy resin based on 4,4'-dioxydiphenylpropane having an epoxide equivalent weight of 240 to 290,
24% by weight of styrene and
6% by weight of acrylic acid.

(2)

45% by weight of linseed oil fatty acid monoethanolamide,
23% by weight of an epoxy resin of number (1),
25% by weight of ethylacrylate and
7% by weight of acrylic acid.

(3)

50% by weight of the reaction product from 280 g. of linseed fatty acid and 105 g. of diethanolamine,
28% by weight of the epoxy resin of number (1),
14.5% by weight of styrene and
7.5% by weight of acrylic acid.

(4)

40% by weight of linseed fatty acid monoethanolamide,
40% by weight of an epoxy resin based on 4,4'-dioxydiphenylpropane having an epoxide equivalent weight of 450 to 525,
13% by weight of styrene and
7% by weight of acrylic acid.

(5)

40% by weight of dehydrated castor oil fatty acid monoethanolamide,
30% by weight of the epoxy resin of number (4),
20% by weight of styrene and
10% by weight of acrylic acid.

Being employed as binding agents the following mixtures are preferably used:

(6)

The mixture of 30 parts by weight of a p-tert.-butylphenol resol and 70 parts by weight of the resin of number (5).

(7)

The mixture of 30 parts by weight of a phenol resin based on 4,4'-dioxy-diphenylpropane being charged with an amount of formaldehyde of about 4 and 70 parts by weight of the resin of number (4).

(8)

The mixture of 20 parts by weight of hexamethoxymethylmelamine and 80 parts by weight of the resin of number (4).

(9)

The pre-condensate made of 30 parts by weight of a p-tert.-butylphenol resol etherified with n-butanol and 80 parts by weight of the resin of number (1).

(10)

The pre-condensate made of 30 parts by weight of a phenol resol based on 4,4'-dioxy-diphenylpropane being charged with an amount of formaldehyde of about 4 and 70 parts by weight of the resin of number (5).

(11)

The pre-condensate made from 20 parts by weight of hexamethoxymethylmelamine and 80 parts by weight of the resin of number (5).

Example 1

400 g. of soybean fatty acid monoethanolamide and 0.6 g. of a 40% by weight solution of boron trifluoride in ether are dissolved in 150 g. of dioxane. To this is added dropwise, at 80° C., a solution of 280 g. of an epoxide resin having an epoxide equivalent weight of 240 to 290, a viscosity of 500 to 1000 cp., measured at 70% by weight solution in n-butyl glycol at 25° C., and a refractive index of 1.5830, which was obtained in a known manner by condensation of bisphenol A with epichlorhydrin, in 150 g. of dioxane. After completion of the addition, the mixture is kept at 80° C. for a further hour. The dioxane is then removed by vacuum distillation. A mixture of 240 g. of styrene, 60 g. of acrylic acid, 6 g. of di-tert.-butyl peroxide and 6 g. of laurylmercaptan is added to the residue at 150° C. over the course of 2.5 hours. After completion of the addition, the mixture is kept at 150° C. until the solids content has reached 98% by weight. The remainder of the unreacted monomers is then removed by vacuum distillation. The product has a viscosity of 250 cp., measured 1:1 in n-butyl glycol at 20° C., and an acid number of 32. It is diluted with isopropyl glycol to a solids content of 80% by weight. The resin which has been neutralized with triethylamine can be infinitely diluted with water. The resin is suitable for use as a sole binder for the electrophoretic method of application.

The resin obtained according to Example 1 is mixed with a phenolic resin-ether-carboxylic acid, described in the documents of Belgian Pat. 724,923 Example 2, in the ratio of 7:3, relative to the solids content. The manufacture of the phenolic resin-carboxylic acid will still be described subsequently. The resin mixture is neutralized with triethylamine and diluted with water to a solids content of 40% by weight. The paste is then ground in a ceramic ball mill with titanium dioxide Kronos RN 59 (Titangesellschaft) in such a way that the pigment-binder ratio is 0.5:1. Thereafter the paste is diluted to a solids content of 10% by weight with water. The solution is introduced into a 10 x 10 x 18 cm. steel basin, and passivized steel sheets (Bonder 1024 Metallgesellschaft) are coated therein by applying an electrical DC potential at 110 volt. The sheets are then stoved for 30 minutes at 170° C., and extremely hard, resistant coatings are produced.

Manufacture of the etherified phenolresol.—686.5 g. p-tert.-butylphenolresol are dehydrated in vacuo up to 90° C., and 1650 g. of n-butanol and 835 g. of toluene are then added. The mixture is heated to the boil and the water is removed by azeotropic distillation, with the solvent mixture being returned into the reaction vessel. After removal of approx. 40 g. of water, 8 g. of 85% by weight of phosphoric acid are added and the azeotropic distillation is continued until no further water passes over. Thereafter the acid is neutralized with calcium hydroxide added in the solid form. The product is concentrated in vacuo up to a temperature of 110° C. and is then filtered. The solids content is approx. 92% by weight.

Manufacture of the phenolic resin-carboxylic acid.—340 g. of etherified phenolresols, obtained as described above, and 70 g. of dimethylolpropionic acid are mixed and heated to 150–160° C. in vacuo, and kept under these conditions until approx. 100 g. of distillate (n-butanol) have passed over. The product then has a viscosity of 150 cp., measured 1:1 in butyl glycol at 20° C., and an acid number of 90.

The product is diluted to 80% by weight of solids content with isopropyl glycol. The neutralized resin can be infinitely diluted with water at pH 8.5.

The resin obtained according to Example 1 is mixed in the weight ratio of 8:2 with an anionic melamine resin according to the French patent specification 1,544,219. This mixture is pigmented as described in Example 1 of this invention, and is electrophoretically deposited, again as described in Example 1. The metal sheets are stoved for 30 minutes at 150° C. Hard coatings with relatively bright gloss are produced.

Manufacture of the anionic melamine resin.—390 g. of hexamethoxymethylmelamine, 150 g. of n-butanol and 140 g. of glycolic acid n-butyl ester are mixed and 0.1 g. of p-toluenesulphonic acid is added as the catalyst. The mixture is heated to 100–110° C. until no further distillate passes over. A vacuum is then applied, and the unreacted proportion of alcohol and ester is distilled off. Thereafter 100 ml. of 5 n NaOH and 100 ml. of water are added. The mixture is boiled for 1 hour under reflux. The water is then removed by azeotropic distillation, using benzene as the stripping agent. Thereafter, the benzene is distilled off in vacuo and a solution of 30 g. of oxalic acid in 100 g. of acetone is added to the mixture at 30° C. The whole is well stirred and subsequently filtered. The resin is then neutralized with triethylamine. It can be infinitely diluted with water and can be used for electrophoretic lacquering.

Example 2

400 g. of linseed oil fatty acid monoethanolamide and 210 g. of the epoxide resin described in Example 1 are mixed with one another. A solution of 0.6 g. of 40% by weight of boron trifluoride solution in ether, in 10 g. of linseed oil fatty acid ethanolamide is added thereto at 40° C. The mixture is then kept at 80° C. for 2 hours. A mixture of 220 g. of ethyl acrylate, 60 g. of acrylic acid, 5.8 g. of di-tert.-butyl peroxide and 7.7 g. of laurylmercaptan is added dropwise over the course of 2½ hours to the product obtained, at 150° C. The mixture is then kept at 150° C. until the solids content has reached 98% by weight. The remainder of the unreacted monomers is then removed by vacuum distillation. The product has a viscosity of 150 cp., measured 1:1 in butyl glycol at 20° C., and an acid number of 30. It is diluted to a solids content of 80% by weight with isopropyl glycol. The resin which has been neutralized with triethylamine can be infinitely diluted with water.

The resin obtained according to Example 2 is neutralized with concentrated ammonia solution and diluted to 40% by weight solids content with water. Drier is added to the solution in the form of cobalt drier (Cyclodex), 0.1% by weight of cobalt, calculated relative to solid resin. A film applied to a glass plate at a layer thickness of 90μ is dust-dry within 2 hours. In the pigmented state, the coating composition is extremely suitable for corrosion protection primers and is distinguished by high resistance towards salt spray mist. The pH value of the solution applied is 9.5. After 21 days' storage at 50° C. the pH value was 9.4. The drying properties of the product had not changed during this interval.

Example 3

160 g. of the resin described in Example 1 are manufactured, but here the resin is not diluted with isopropyl glycol as described in Example 1, and instead 43.5 g. of the etherified phenol resol, the manufacture of which is described in Example 1, are added. 1 g. of a 40% by

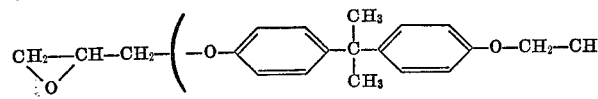

weight of isobutanol solution of 80% by weight phosphoric acid is added and the mixture is heated to 140° C. in vacuo and kept at this temperature until an acid number of approx. 42 has been reached and the viscosity is 150 cp., measured 1:1 in butyl glycol at 20° C. The resin is then diluted to 80% by weight of solids content with diacetone-alcohol, and neutralized with diisopropanolamine to a pH value of approx. 8. It is suitable for use as a sole binder for electrophoretic lacquering.

Example 4

The resin combination described in Example 3 is neutralized with N,N,N',N'-tetrakis-(2-hydroxypropyl)ethylenediamine instead of with diisopropanolamine. The resin is very suitable for spraying primers and can be stoved in thick layers without sputtering.

Example 5

160 g. of the resin described in Example 1 are manufactured, but the resin is not diluted with butyl glycol as described in Example 1, and instead 40 g. of hexamethoxymethylmelamine are admixed. 0.1 g. of p-toluenesulphonic acid is added and the mixture is heated to 120° C. in vacuo. As soon as the acid number has declined to 35, the resin is diluted to a solids content of 80% by weight with isopropyl glycol and is neutralized with diisopropanolamine. The resin is suitable for electrophoretic lacquering to achieve light-colored coatings.

Example 6

450 g. of an epoxide resin with an epoxide equivalent weight of 450–525, and a softening point of 65°–75° C., which was obtained in a known manner by reaction of bisphenol A with epichlorhydrin, are dissolved in 500 g. of xylene. 400 g. of castor oil fatty acid monoethanolamide are added thereto. Thereafter a solution of 1 g. of 40% by weight of boron trifluoride in ether in 30 g. of castor oil fatty acid monoethanolamide is added and the whole is boiled for one hour at the reflux temperature. The xylene is then removed by vacuum distillation. The resin is then diluted to a solids content of 80% by weight with ethyl glycol and a mixture of 80 g. of acrylic acid, 200 g. of ethyl acrylate, 90 g. of n-butyl acrylate, 10 g. of di-tert.-butyl peroxide and 10 g. of laurylmercaptan is added over the course of 3 hours at 140° C. This temperature is maintained until the solids content has reached 85% by weight. The resin is suitable for use as a sole binder for electrophoretic lacquering.

Example 7

The procedure of Example 2 is followed, but instead of the linseed oil fatty acid monoethanolamide the reaction product of 300 g. of linseed oil fatty acid and 105 g. of diethanolamine at 220° C. is employed. The binding agent is qualified for air-drying coating compositions.

While this invention has been described with reference to certain specific embodiments, it will be recognized by those skilled in the art that many variations are possible without departing from the scope and spirit of the invention.

I claim:
1. A process for the production of vinyl-modified polyether resins by etherifying an epoixde compound with an unsaturated hydroxyl-containing compound having at least one ethylenic double bond, co-polymerizing the etherified product through its centers of unsaturation with an α,β-ethylenically unsaturated carboxylic compound and neutralizing the copolymer with aqueous ammonia or strong organic nitrogen bases, characterized in that
(a) 20–45% by weight of glycidylether of the formula

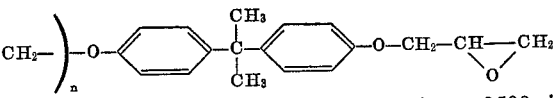

and having a molecular weight of 380 to 3500, is reacted at a temperature of 40° C. to 150° C., in the presence of a catalyst, with
(b) 35–55% by weight of alkanolamides of unsaturated fatty acids or oxazolines of unsaturated fatty acids of the general formula

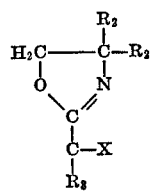

(II)

wherein $R_2$ represents a hydroxymethyl or alkyl radical with 3 carbon atoms, with the proviso that at least one $R_2$ is a hydroxymethyl radical, $R_3$ is a hydrocarbon with single or multiple unsaturation and containing 8 to 18 carbon atoms, and X denotes $H_2$ or $=CH_2$, and the reaction products are then copolymerized at a temperature of 120° C. to 180° C. with (c) 5–20% by weight of $\alpha,\beta$-ethylenically unsaturated mono or dicarboxylic acids, their anhydrides or half-esters with monoalcohols of 1 to 4 carbon atoms, in the presence of (d) 10–30% by weight of other vinyl or vinylidene compounds, so that the reaction products have an acid number of at least 25 and a viscosity of 95–800 cp., measured 1:1 in n-butylglycol at 20° C., and the reaction products are then treated with such amounts of aqueous ammonia or a strong organic nitrogen base up to complete or partial neutralization so that the reaction products are adequately capable of dispersion or dilution with water.

2. Process according to claim 1, characterized in that reaction products of diethanolamine or amines of the polyhydric propanols or amines of the polyhydric butanols with unsaturated fatty acids with 10 to 20 carbon atoms are employed as oxazolines.

3. Process according to claim 1, characterized in that the etherification is carried out with the hydroxyl groups of the unsaturated alkanolamines or oxazolines always present in excess over the epoxide groups of the epoxide-carrying compounds.

4. Process according to claim 3, characterized in that the etherification is effected by heating the components (a) and (b) to a temperature in the range of 60 to 120° C.

5. Process according to claim 1, characterized in that, in stage (c), methacrylate, methyl methacrylate, ethyl acrylate, ethyl methacrylate, 2-hydroxyethyl acrylate, 2-hydroxypropyl acrylate as well as styrene, $\alpha$-methylstyrene and vinyltoluene, individually or as a mixture, are used as other vinyl or vinylidene compounds.

6. Process according to claim 1, characterized in that acrylic acid, methacrylic acid, cinnamic acid, $\beta$-benzoylacrylic acid, crotonic acid, able to form these, such as maleic acid, fumaric acid, citraconic acid, itaconic acid, methaconic acid or aconitic acid or monoesters of the abovementioned, polycarboxylic acids with saturated straight chain monoalcohols with 1 to 4 carbon atoms, or monomethyl maleate, chlormaleic acid or maleic anhydride, are employed as monomers, carrying carboxylic groups, in stage (c).

7. Process according to claim 1, characterized in that the unsaturated alkanolamide is a mono or diethanolamide of linseed oil fatty acid, tall oil fatty acid, soybean fatty acid or castor oil fatty acid.

8. Water dilutable binders or coating agents, when prepared according to the process of claim 1.

9. Binders for air-drying coating compositions when prepared according to the process of claim 1.

10. Coating composition, which can be deposited electrophoretically, when prepared according to the process of claim 1.

References Cited

UNITED STATES PATENTS

| | | | |
|---|---|---|---|
| 2,792,381 | 5/1957 | Shokal | 260—836 |
| 2,826,562 | 3/1958 | Shokal | 260—836 |
| 3,198,762 | 8/1965 | Maeder | 260—80.76 |
| 3,240,740 | 3/1966 | Knapp | 260—80.76 |
| 3,247,144 | 4/1966 | Masters | 260—837 |
| 3,247,286 | 4/1966 | Masters | 260—837 |
| 3,454,418 | 7/1969 | Forsberg | 260—837 |

FOREIGN PATENTS

| | | | |
|---|---|---|---|
| 1,162,568 | 2/1964 | Germany | 260—836 |
| 1,163,550 | 2/1964 | Germany | 260—836 |
| 1,169,135 | 4/1964 | Germany | 260—836 |
| 1,203,474 | 10/1965 | Germany | 260—836 |

PAUL LIEBERMAN, Primary Examiner

U.S. Cl. X.R.

260—19 Ep, 19 UA, 21, 23 Ep, 23.7 A, 23.7 N, 29.6 H, 37 Ep, 41 A, 41 B, 80.76, 831, 834, 836

UNITED STATES PATENT OFFICE
CERTIFICATE OF CORRECTION

Patent No. 3,705,206     Dated December 5, 1972

Inventor(s)   BERNHARD BROECKER

It is certified that error appears in the above-identified patent and that said Letters Patent are hereby corrected as shown below:

| Patent Reads: | Application Reads: |
|---|---|
| Col. 1, line 44<br>"oxalolines" | Page 1, line 28<br>---oxazolines--- |
| Col. 3, line 66<br>"or general" | Page 7, line 11<br>---of general--- |
| Col. 3, line 71<br>"2,2-bis-4-" | Page 7, line 19<br>---2,2-bis-(4--- |
| Col. 4, line 55<br>"oxalzoline" | Page 9, line 24<br>---oxazoline--- |
| Col. 6, line 8<br>"admixers" | Page 13, line 6<br>---admixtures--- |
| Col. 6, line 71<br>"balt (II)" | Page 15, line 15<br>---cobalt (II)--- |
| Col. 6, line 74<br>"solvents," | Page 15, line 19<br>---solvents.--- |
| Col. 7, line 18<br>"the like" | Page 16, line 9<br>---and the like" |
| Col. 7, line 47<br>"into timber" | Page 17, line 12<br>---onto timber--- |

UNITED STATES PATENT OFFICE
CERTIFICATE OF CORRECTION Page -2-

Patent No. 3,705,206     Dated December 5, 1972

Inventor(s) BERNHARD BROECKER

It is certified that error appears in the above-identified patent and that said Letters Patent are hereby corrected as shown below:

| Patent Reads: | Application Reads: |
|---|---|
| Col. 9, line 25<br>"of worming" | Page 21, line 30<br>---on warming--- |
| Col. 9, line 41<br>"carred" | Page 22, line 15<br>---carried--- |
| Col. 9, line 54<br>"hydropholic" | Page 22, line 30<br>---hydrophilic--- |
| Col. 10, line 39<br>"R'$_3$=-H,-(CH$_2$-CH$_2$-C)" | Page 25, line 1<br>---R'$_3$= -H,-(CH$_2$-CH$_2$-O)--- |
| Col. 10, line 39<br>"$-(CH_2 - \underset{N}{\underset{|}{\overset{CH_3}{\overset{|}{C}}}} - O)_x$" | Page 25, line 1<br>$--- -(CH_2 - \underset{H}{\underset{|}{\overset{CH_3}{\overset{|}{C}}}} - O)_x ---$ |

Signed and sealed this 15th day of October 1974.

(SEAL)
Attest:

McCOY M. GIBSON JR.        C. MARSHALL DANN
Attesting Officer           Commissioner of Patents